United States Patent
Gil et al.

(10) Patent No.: US 9,119,126 B2
(45) Date of Patent: Aug. 25, 2015

(54) METHOD FOR DETERMINING HANDOVER IN WIRELESS COMMUNICATION SYSTEM AND BASE STATION THEREFOR

(75) Inventors: Gye-Tae Gil, Daejeon (KR); Dong-Hoi Kim, Gangwon-do (KR); Doo-Won Lee, Gangwon-do (KR)

(73) Assignee: KT CORPORATION, Gyeonggi-do (KR)

( * ) Notice: Subject to any disclaimer, the term of this patent is extended or adjusted under 35 U.S.C. 154(b) by 215 days.

(21) Appl. No.: 13/876,633

(22) PCT Filed: May 23, 2011

(86) PCT No.: PCT/KR2011/003759
§ 371 (c)(1),
(2), (4) Date: Jun. 7, 2013

(87) PCT Pub. No.: WO2012/043957
PCT Pub. Date: Apr. 5, 2012

(65) Prior Publication Data
US 2013/0260764 A1    Oct. 3, 2013

(30) Foreign Application Priority Data
Sep. 28, 2010  (KR) .......................... 10-2010-0093876

(51) Int. Cl.
*H04W 36/22*    (2009.01)
*H04W 36/30*    (2009.01)

(52) U.S. Cl.
CPC .............. *H04W 36/22* (2013.01); *H04W 36/30* (2013.01)

(58) Field of Classification Search
USPC .................................................. 455/436–445
See application file for complete search history.

(56) References Cited

U.S. PATENT DOCUMENTS

| 6,745,033 | B1 * | 6/2004 | Shah et al. ..................... 455/436 |
| 2009/0061876 | A1 | 3/2009 | Ho et al. |
| 2009/0203380 | A1 | 8/2009 | Park et al. |
| 2010/0210271 | A1 | 8/2010 | Neubacher |
| 2012/0282931 | A1 * | 11/2012 | Giustina et al. ............... 455/437 |

FOREIGN PATENT DOCUMENTS

| EP | 2048907 A1 | 4/2009 |
| KR | 10-2009-0042267 A | 4/2009 |
| KR | 10-2010-0050546 A | 5/2010 |
| KR | 10-2010-0065154 A | 6/2010 |

* cited by examiner

*Primary Examiner* — Diane Mizrahi
(74) *Attorney, Agent, or Firm* — IP Legal Services, LLC

(57) ABSTRACT

A handover decision is capable of lowering a handover failure rate of horizontal handover between a source base station and a target base station in a wireless communication system. After deciding a target base station to which the mobile terminal is to be handed over, a hysteresis value for determining a handover execution point is decided, and execution of the handover of the mobile terminal occurs when a difference between the received signal strength of a signal received from the target base station to the mobile terminal and the received signal strength of a signal received from the source base station to the mobile terminal is continuously maintained at the hysteresis value or above during a predetermined time.

18 Claims, 4 Drawing Sheets

<PRIOR ART>

METHOD FOR DETERMINING HANDOVER IN WIRELESS COMMUNICATION SYSTEM AND BASE STATION THEREFOR

CROSS REFERENCE TO RELATED APPLICATIONS

This application is a National Stage Patent Application of PCT International Patent Application No. PCT/KR2011/003759 (filed on May 23, 2011) under 35 U.S.C. §371, which claims priority to Korean Patent Application No. 10-2010-0093876 (filed on Sep. 28, 2010), the teachings of which are incorporated herein in their entireties by reference.

TECHNICAL FIELD

The present disclosure relates to handover in a wireless communication system, and more particularly, to execution of handover in a wireless communication system.

BACKGROUND ART

The present application claims priority to Korea Patent Application No. 10-2010-0093876 filed in the Republic of Korea on Sep. 28, 2010, the disclosures of which is hereby incorporated by reference in its entirety.

In a mobile communication system, a mobile terminal decides a serving base station (i.e., Serving eNodeB) thereof according to a fixed rule, registers in the serving base station, and then forms a wireless link to send or receive data to/from the other terminals. Since a mobile terminal moves around, the mobile terminal receives, from the serving base station, a signal having a received signal strength (RSS) varying accordingly to changes in position. For example, when a mobile terminal moves far away from the serving base station or enters into a shadow zone, the received signal strength of the signal received from the serving base station might decrease lower than a given threshold value $R_{TH}$, making it difficult for the mobile terminal to send or receive data to/from the serving base station. In this case, the serving base station selects one of adjacent base stations and allows the mobile terminal to access the newly selected base station so that a call channel of the mobile terminal is continuously maintained. Such operation is commonly referred to as "handover".

FIG. 1 is a diagram for illustrating a general handover process. In a common handover process, a source base station (i.e., source eNodeB) may denote a serving base station connected to a mobile terminal for a related service and a target base station (i.e., Target eNodeB) denotes a base station to be connected to the mobile terminal as a result of handover.

As shown in FIG. 1, when the mobile terminal (i.e., user equipment: UE) moves far away from the source base station, the received signal strength (RSS) $R_S$ of a signal received from the source base station decreases. In addition, when the RRS ($R_S$) of the signal received from the source base station decreases lower than a given threshold value $R_{TH}$, the source base station decides the execution of handover by selecting one of adjacent base stations as a target base station and allows the mobile terminal to access the newly selected target base station (since the received signal strength (RSS) $R_T$ of a signal received from the target base station increases as the mobile terminal moves toward it). Accordingly, the mobile terminal may continuously maintain the call channel for communication.

The handover may be classified into a hard handover and a soft handover. The hard handover establishes a new link between a mobile terminal and a target base station after releases an existing link between the mobile terminal and a service base station. Unlike the hard handover, the soft handover retains the existing connection between the mobile terminal and the serving base station until a new link is completely established between the mobile terminal and the target base station. Hereinafter, a typical handover process will be described based on the hard handover.

FIG. 2 shows a signal flow for illustrating a typical handover process. As shown in FIG. 2, the typical handover process may include a handover preparation process, a handover execution process, and a handover completion process.

In the handover preparation process, a mobile terminal measures a wireless quality and sends a measurement report thereof to a source base station (Source eNB) at step S101. The source base station determines whether to execute handover based on the measurement report at step S103. For example, when the source base station, based on the measurement result, determines that the received signal strength of the mobile terminal decreases lower than a threshold value, the source base station initiates handover at step S103. Upon the initiation of the handover, the source base station transmits a handover request message to a target base station (Target eNB) at step S105. The target base station performs a handover admission control operation at step S107 and sends a handover request confirmation message to the source base station at step S109.

The handover execution process is performed when the target base station accepts the handover request from the source base station in the handover preparing process as described above. In the handover execution process, the source base station sends a handover command to the mobile terminal at step S111. The mobile terminal performs an accessing procedure in order to access the target base station at step S113. The source base station forwards downstream data to the target base station while the mobile terminal performs the accessing procedure at step S115.

After the completion of the above handover execution process, the handover completion process is performed. For example, when the mobile terminal successfully accesses the target base station, the mobile terminal sends a handover completion message to the target base station at step S117). In response to the handover completion message, the target base station sends a handover completion response message to the mobile terminal at step S119. In this process, a data path between the source base station and a core network is changed to a data path between the target base station and the core network is established.

DISCLOSURE

Technical Problem

Meanwhile, when the mobile terminal attempts to access the target base station, the mobile terminal may fail to access the target base station due to various factors such as a channel status change, resource depletion of the target base station, or the like. This may be referred to as 'handover failure'. A handover failure rate may be calculated by dividing the number of handover failures by the number of handover attempts. In general, such a handover failure rate is affected greatly by an algorithm used for deciding the execution of handover in the handover preparing process. Therefore, in order to lower the handover failure rate (HFR), it is preferred to use a handover decision algorithm which considers not only the received signal strength of signals from the source base station and the target base station but also various aspects such as load status change of both base stations.

The present disclosure is designed to overcome the above problems, and the present disclosure is directed to providing a handover deciding method, which may lower a handover failure rate of horizontal handover between a source base station and a target base station in a wireless communication system, and a base station for the same.

Technical Solution

Other objects and advantages of the present invention will be understood from the following descriptions and become more apparent from the embodiments of the present invention. Also, it will be understood that the objects and advantages of the present invention can be realized by means defined in the claims of the present invention and a combination thereof.

In one aspect of the present disclosure, a method may be provided for deciding execution of handover of a mobile terminal from a source base station to a target base station in a wireless communication system. The method may include: deciding a target base station for handover of the mobile terminal; deciding a hysteresis value for determining a time point of executing the handover; determining whether a difference between a first received signal strength of a signal from the target base station to the mobile terminal and a second received signal strength of a signal from the source base station to the mobile terminal is continuously maintained to be equal to or greater than the hysteresis value for a predetermined time duration; and deciding to execute the handover when the difference between the first received signal strength and the second received signal strength is continuously maintained to be equal to or greater than the hysteresis value for the predetermined time duration For the deciding a hysteresis value, the decision for the hysteresis value may be based on traffic loads of the source base station and the target base station, a movement speed of the mobile terminal, and traffic distribution in the mobile terminal.

For the deciding a hysteresis value, the decision for the hysteresis value may be based on assigned weights to the traffic loads of the source base station and the target base station, the movement speed of the mobile terminal, and the traffic distribution in the mobile terminal, wherein a sum of the assigned weights is 1.

For the deciding a hysteresis value, the hysteresis value may increase as a load of the target base station increases to greater than a load of the source base station.

For the deciding a hysteresis value, the hysteresis value may decrease as a real time traffic proportion increases in the traffic of the mobile terminal.

For the deciding a hysteresis value, the hysteresis value may increase as the movement speed of the mobile terminal decreases.

In another aspect of the present disclosure, a base station may be provided for deciding execution of handover of a mobile terminal in a wireless communication system. The base station may include a target base station deciding unit, a hysteresis value deciding unit, and a handover execution deciding unit. The target base station deciding unit may be configured to decide a target base station for handover of the mobile terminal. The hysteresis value deciding unit may be configured to decide a hysteresis value for determining a time point for executing the handover. The handover execution deciding unit may be configured to decide to execute the handover when a difference between a first received signal strength of a signal from the target base station to the mobile terminal and a second received signal strength of a signal from the source base station to the mobile terminal is continuously maintained to be equal to or greater than the hysteresis value for a predetermined time duration.

The hysteresis value deciding unit may decide the hysteresis value based on traffic loads of the source base station and the target base station, a movement speed of the mobile terminal, and traffic distribution in the mobile terminal.

The hysteresis value deciding unit may decide the hysteresis value by assigning weights to the traffic loads of the source base station and the target base station, the movement speed of the mobile terminal, and the traffic distribution in the mobile terminal, where a sum of the assigned weights is 1.

The hysteresis value deciding unit may increase the hysteresis value as a load of the target base station increases to be greater than a load of the source base station.

The hysteresis value deciding unit may decrease the hysteresis value as a real time traffic proportion increases in the traffic of the mobile terminal.

The hysteresis value deciding unit may increase the hysteresis value as the movement speed of the mobile terminal decreases.

Advantageous Effects

In accordance with at least one embodiment of the present disclosure, a handover failure rate may be lowered when a horizontal handover of a mobile terminal is requested in a wireless communication system. Accordingly, a communication service may be stably provided.

In addition, a mobile terminal may be restrained from handover to a target base station when the target base station has a relatively great load in accordance with at least one embodiment of the present disclosure. Accordingly, a load of the target base station may decrease and a handover failure rate may be lowered.

In accordance with at least one embodiment of the present disclosure, a mobile terminal is restrained from handover when the mobile terminal moves at a comparatively low speed. Accordingly, the handover process may be prevented from frequently occurring within a comparatively short distance due to shadow fading.

DESCRIPTION OF DRAWINGS

Other objects and aspects of the present disclosure will become apparent from the following descriptions of the embodiments with reference to the accompanying drawings in which.

DESCRIPTION OF THE PREFERRED EMBODIMENT

Best Mode

Other objects, features and advantages of the present invention will become apparent from the following descriptions of the embodiments with reference to the accompanying drawings, from which it will be deemed that a person having ordinary skill can easily practice the technical spirit of the present invention. Also, any explanation of the prior art known to relate to the present invention may be omitted if it is regarded to render the subject matter of the present invention vague. Hereinafter, preferred embodiments of the present invention will be described in detail with reference to the accompanying drawings.

Figure 1:
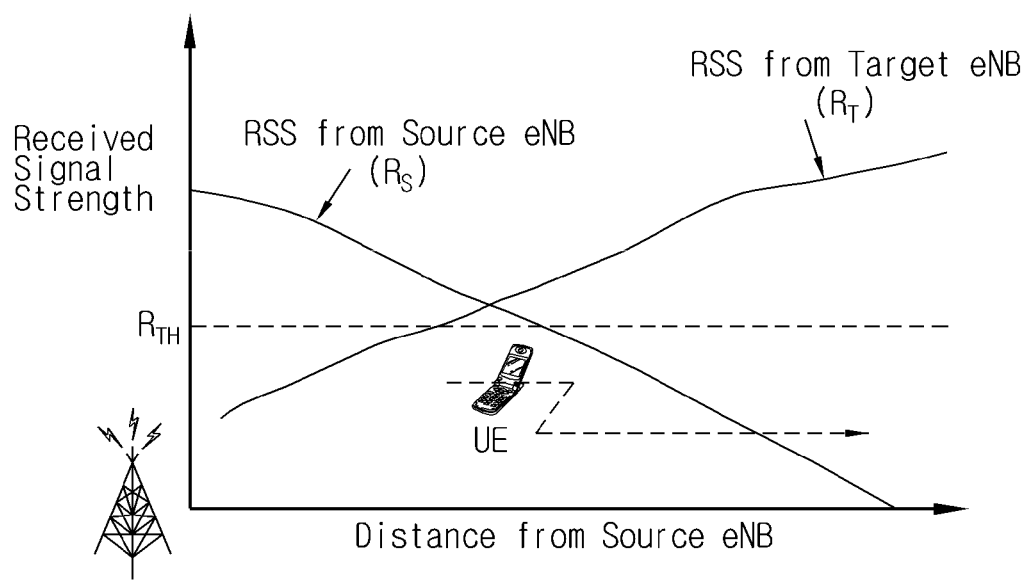
FIG. 1 illustrates a handover process of the prior art.
Figure 2:
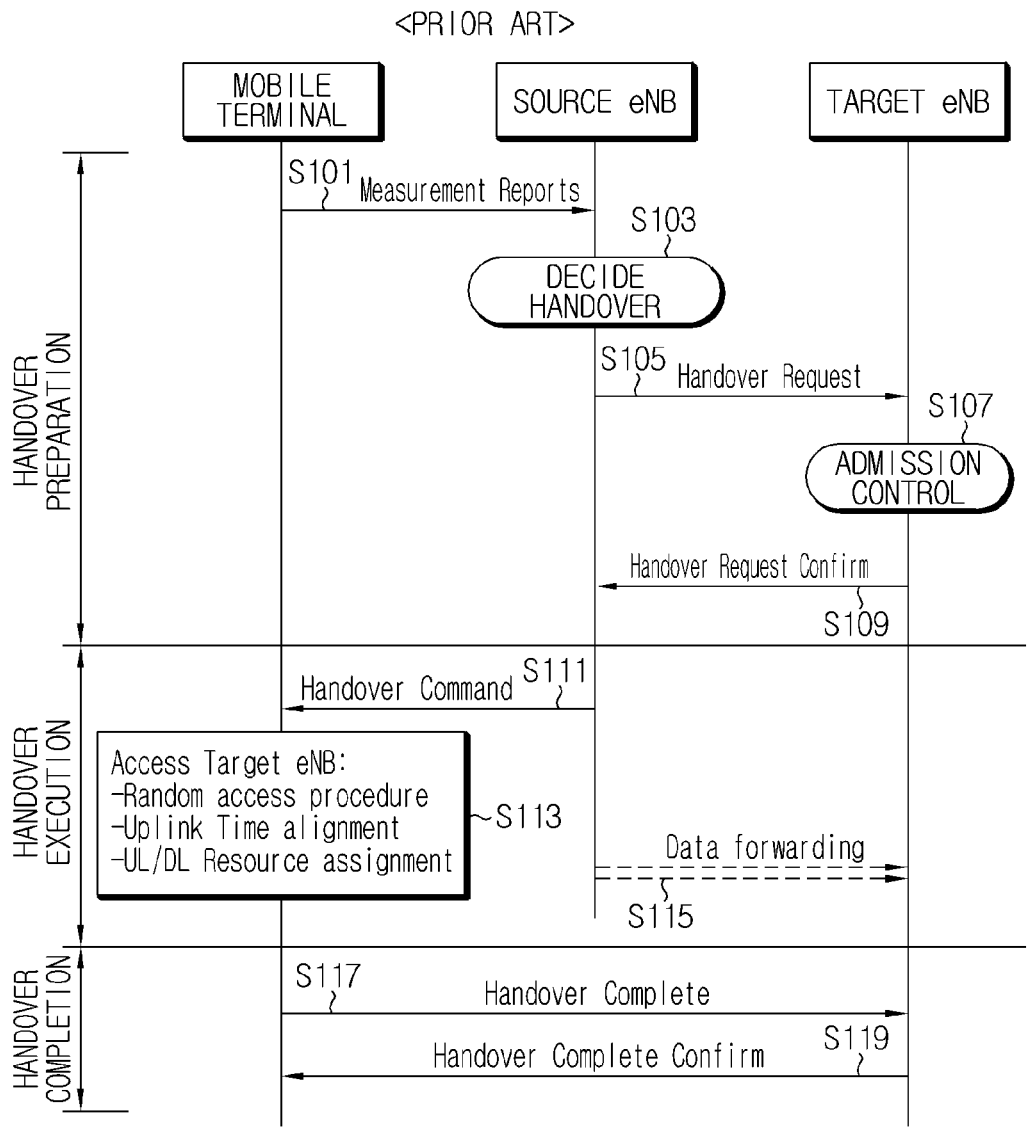
FIG. 2 shows a prior art signal flow for illustrating a typical handover process of FIG. 1.
Figure 3:
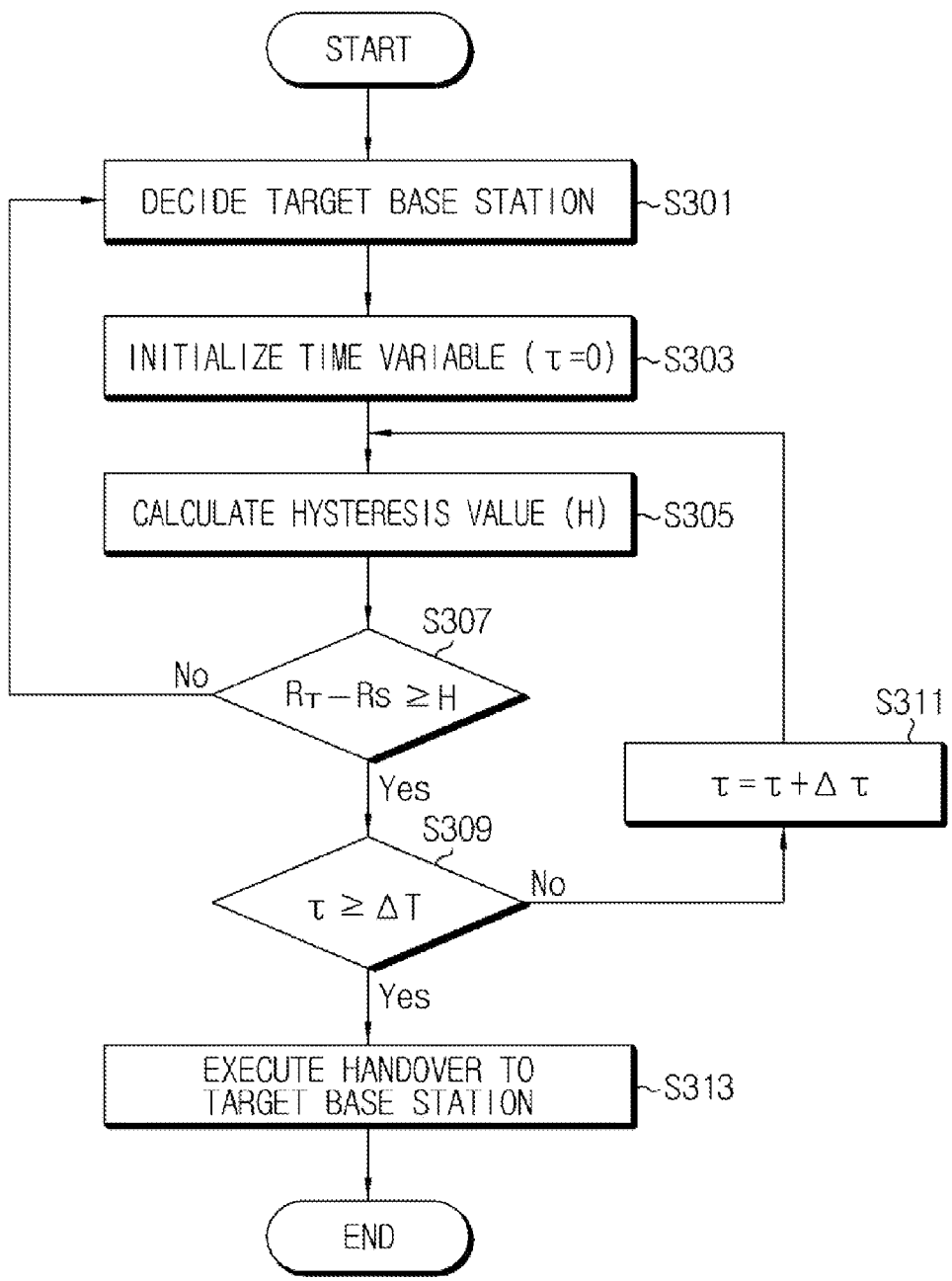
FIG. 3 is a flowchart for illustrating a method for deciding execution of handover at a source base station in accordance with at least one embodiment of the present disclosure.

FIG. 3 is a flowchart for illustrating a method for deciding execution of handover at a source base station in accordance with at least one embodiment of the present disclosure. In this embodiment shown in FIG. 3, an adaptive hysteresis scheme may be applied to decide execution of handover. The adaptive hysteresis scheme may minimize a handover failure rate of a mobile terminal.

Referring to FIG. 3, a mobile terminal measures a wireless quality and sends a measurement report thereof to a source base station. The source base station receives the measurement report. Based on the measurement report, the source base station determines whether received signal strength of a signal from the source base station to the mobile terminal is lower than a threshold value. At step S301, the source base station decides on a target base station in order to perform handover of the mobile terminal when the source base station determines that the received signal strength is lower than the threshold value. In other words, the source base station initiates a handover preparation process. Since selection of the target base station may be decided in various ways the present disclosure is not limited to a specific method.

After deciding on the target base station as described above, the source base station initializes a time variable (i.e., $\tau=0$) at step S303 and calculates a hysteresis value H at step S305. The hysteresis value is calculated based on load statuses of the source base station and the target base station, traffic distribution in the mobile terminal, a movement speed of the mobile terminal, or the like. A method of calculating the hysteresis value will be described subsequently. In this embodiment, the hysteresis value is described as an important factor for deciding the execution of handover. For example, the hysteresis value may be a threshold value.

After calculating the hysteresis value, the source base station determines whether a received signal strength Rt of the target base station is greater than received signal strength $R_S$ of the source base station by the calculated hysteresis value or more at step S307. The received signal strength $R_S$ may be signal strength of a signal transmitted from the source base station and received at the mobile terminal. The received signal strength $R_T$ may be signal strength of a signal transmitted from the target base station and received at the mobile terminal. The mobile terminal may periodically report the received signal strength $R_S$ and the received signal strength Rt. The source base station subtracts the received signal strength $R_S$ of the source base station from the received signal strength $R_T$ of the target base station and determines whether the subtraction result is equal to or greater than the calculated hysteresis value H.

Unless the received signal strength $R_T$ of the target base station is greater than the received signal strength $R_S$ of the source base station by the calculated hysteresis value H (No-S307), the source base station returns to performing the handover preparation process at step S301. Namely when the subtraction of the received signal strength $R_S$ of the source base station from the received signal strength $R_T$ of the target base station is smaller than the calculated hysteresis value, the source base station returns to the handover preparation process at step S301. For example, the source base station determines whether the received signal strength of the signal from the source base station to the mobile terminal is lower than the threshold value The source base station initiates the handover preparing process when the source base station determines that the received signal strength is lower than the threshold value. The source base station does not initiate the handover preparing process when the source base station determines that the received signal strength is not lower than the threshold value.

When the subtraction of the received signal strength $R_S$ of the source base station from the received signal strength $R_T$ of the target base station is smaller than the calculated hysteresis value, the source base station may perform a time variable initializing process again to calculate a hysteresis value again without returning to the handover preparation process.

When the subtraction of the received signal strength $R_S$ of the source base station from the received signal strength $R_T$ of the target base station is equal to or greater than the calculated hysteresis value (Yes-S307), the source base station determines whether a time variable $\tau$ is equal to or greater than a predetermined reference value $\Delta T$ (Time-to-Trigger) at step S309.

When the time variable $\tau$ is smaller than the predetermined reference value (No-S309), the source base station increases the time variable by a predetermined value $\Delta\tau$ at step S311, and calculates a hysteresis value H again at step S305. Here, $\Delta\tau$ may be time taken for performing the steps S305, S307, and S309. The hysteresis value is calculated based on load statuses of the source base station and the target base station, traffic distribution in the mobile terminal, a movement speed of the mobile terminal, or the like. Since load statuses of the source base station and the target base station, traffic distribution in the mobile terminal, and a movement speed of the mobile terminal change from moment to moment, the hysteresis value is also continuously updated.

After the hysteresis value is calculated again at step S305, the source base station determines whether the subtraction of the received signal strength $R_S$ of the source base station from the received signal strength $R_T$ of the target base station is greater than the recalculated hysteresis value at step S307. When the subtraction result is not greater than the recalculated hysteresis value (No-S307), the source base station performs a handover preparation process again. However, when the subtraction result is greater than the recalculated hysteresis value (Yes-S307), the source base station determines again whether the time variable T is equal to or greater than the predetermined reference value $\Delta T$ (Time-to-Trigger) at step S309. At this time, the time variable has been increased by a predetermined amount from an initial value thereof.

When the time variable $\tau$ is equal to or greater than the predetermined reference value $\Delta T$ (Yes-S309), the source base station decides to execute handover at step S313. For example, at step S313, the source base station sends a handover request message to the target base station and sends a handover command to the mobile terminal if the target base station accepts the handover request. However, when the time variable is smaller than the predetermined reference value (No-S309), the source base station repeats the steps S311, S305, S307, and S309 until the time variable becomes equal to or greater than the predetermined reference value.

In other words, it is determined whether the subtraction of the received signal strength $R_S$ of the source base station from the received signal strength $R_T$ of the target base station is equal to or greater than the hysteresis value. When the subtraction result is equal to or greater than the hysteresis value, it is determined whether such condition is maintained for a predetermined duration (Time-to-Trigger). Only when the condition is maintained during the predetermined duration, handover is executed in accordance with at least one embodiment of the present invention.

Figure 4:
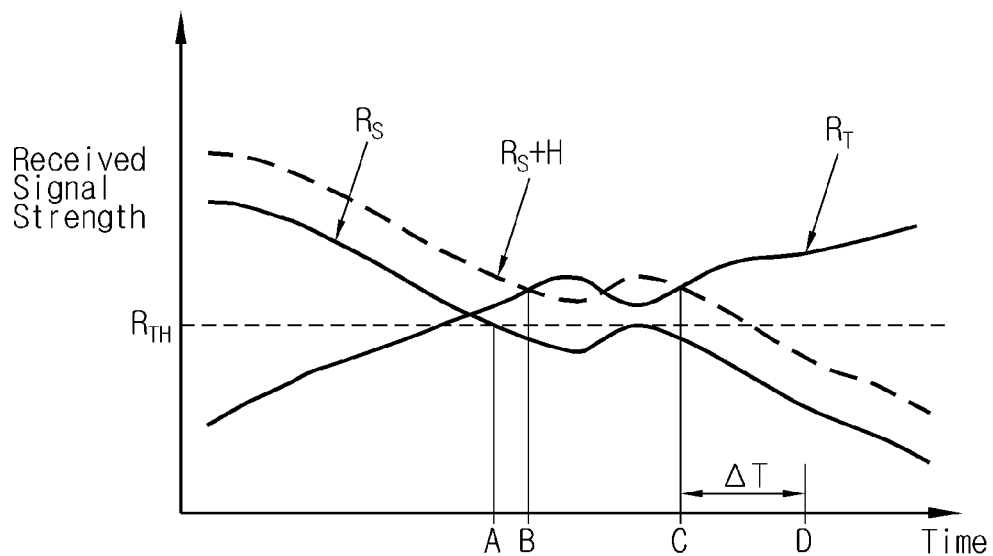
FIG. 4 is a diagram showing a received signal strength of signals received from a source base station and a target base station in accordance with at least one embodiment of the present disclosure.

FIG. 4 is a diagram showing a received signal strength $R_S$ of a source base station and a received signal strength $R_T$ of a target base station in accordance with at least one embodiment of the present disclosure. With reference to FIG. 4, a handover deciding process according to the present disclosure will be described.

As shown in FIG. 4, the source base station initiates the handover preparation process at a point A where the received signal strength $R_S$ of a signal received transmitted from the source base station and received at the mobile terminal becomes smaller than a predetermined threshold value $R_{TH}$. First, the source base station calculates a hysteresis value in consideration of load statuses of the source base station and the target base station, traffic distribution in the mobile terminal, a movement speed of the mobile terminal, or the like.

In addition, the source base station monitors whether the received signal strength $R_T$ of the target base station is continuously maintained greater than a sum of the received signal strength $R_S$ of the source base station and the hysteresis value H during a predetermined duration $\Delta T$ (Time-to-Trigger), after a point B where the received signal strength $R_T$ of the target base station is greater than the received signal strength $R_S$ of the source base station by the calculated hysteresis value. For example, at the point B, the subtraction of the received signal strength Rs of the source base station from the received signal strength $R_T$ of the target base station becomes greater than the calculated hysteresis value.

As shown in FIG. 4, the above condition is not continuously maintained during the predetermined duration $\Delta T$ (Time-to-Trigger) from the point B. Accordingly, the source base station, from a point C, determines again whether the received signal strength $R_T$ of the target base station is maintained to be greater than the sum of the received signal strength Rs of the source base station and the hysteresis value for the predetermined duration $\Delta T$. As shown in FIG. 4, such condition is maintained until a point D where the predetermined duration $\Delta T$ ends. Accordingly, at the point D, the source base station decides to execute handover, sends a handover request to the target base station, and sends a handover execution command to the mobile terminal upon the acceptance of the handover request.

Hysteresis Value Deciding Method

As described above with reference to FIG. 3, a time point triggering the execution of handover changes according to the decided hysteresis value H and the decided Time-to-Trigger value $\Delta T$. Such factors may affect a handover failure rate in a following handover executing process. Therefore, the handover failure rate may be lowered by appropriately deciding the hysteresis value in consideration of load statuses of the source base station and the target base station, traffic distribution in the mobile terminal, a movement speed of the mobile terminal, or the like. Hereinafter, a method of calculating a hysteresis value will be described. As described, such hysteresis value is calculated based on load statuses of the source base station and the target base station, traffic distribution in the mobile terminal, and a movement speed of the mobile terminal, which change in real time in accordance with at least one embodiment of the present disclosure.

The hysteresis value H is not necessarily a fixed value. The hysteresis value H may be a variable value that changes according to time. The hysteresis value H may be calculated using Equation 1 below.

$$H = H_{default} + \alpha \cdot (w_L N_L + w_V N_V + w_S N_S) \quad \text{Equation 1}$$

In Equation 1, $H_{default}$ represents a default value of the hysteresis value H. $N_L$ represents a difference between a load of a source base station and a load of a target base station. $N_V$ represents a movement speed of a mobile terminal and $N_S$ represents a value reflecting traffic distribution in the mobile terminal. $w_L$, $w_V$, and $w_S$ are weights for reflecting relative importance of $N_L$, $N_V$, and $N_S$. For example, the relative importance may be the degree of influence on a handover failure rate. A sum of the weights $w_L$, $w_V$, and $w_S$ is 1. $\alpha$ represents a scaling factor.

The source base station and the target base station periodically transmit load statuses thereof and share the load status information with neighboring base stations. In addition, the base station may measure a speed of the mobile terminal by using round-trip time (RTT) included in a measurement report periodically reported from the mobile terminal. The present invention, however, is not limited thereto. Various methods for sharing load status information and measuring a speed of the mobile terminal may be applied.

Hereinafter, the factors $N_L$, $N_V$, $N_S$ of Equation 1 will be described in more detail.

First, $N_L$ represents a difference between a normalized traffic load $L_T$ of the target base station and a normalized traffic load $L_S$ of the source base station at each unit time. Such difference $N_L$ may be expressed as Equation 2 below. By such definition, the hysteresis value H increases as the load of the target base station become greater than the load of the source base station. As a result, handover to the target base station may be restrained.

$$N_L = L_T - L_S \quad \text{Equation 2}$$

Second, $N_V$ is a value representing a movement speed of a mobile terminal. Assuming that a movement speed of a mobile terminal i is $V_j$ and a maximum speed limit of the mobile terminal is $V_{max}$, $N_V$ may be expressed as Equation 3 below. By defining $N_V$ as Equation 3, a comparatively high hysteresis value H is applied to a mobile terminal moving at a low speed. Accordingly, it may prevent handover from being frequently attempted within a short distance due to shadow fading.

$$N_V = -2 \frac{V_j}{V_{max}} + 1 \quad \text{Equation 3}$$

Third, $N_S$ represents a difference between a non-real time traffic volume $N_{NRT}$ and a real time traffic volume $N_{RT}$ in the mobile terminal and is expressed like Equation 4 below. Both $N_{NRT}$ and $N_{RT}$ are a normalized value by the entire traffic volume of the mobile terminal. $N_{NRT}$ and $N_{RT}$ have the normalized value between 0 and 1. Since $N_S$ is defined as above, the hysteresis value H becomes lower when the real time traffic has a greater proportion in the mobile terminal. Accordingly, the execution of handover is descried quickly and the mobile terminal is enabled to seamlessly and stably transmit real time data traffic.

$$N_S = N_{NRT} - N_{RT} \quad \text{Equation 4}$$

As shown in Equation 2, Equation 3, and Equation 4, $N_L$, $N_V$, and $N_S$ have values between −1 and 1 and the sum of weights $w_L$, $w_V$, and $w_S$ is 1. Accordingly, $(w_L N_L + w_V N_V + w_S N_S)$ in Equation 1 always has a value between −1 and 1 and the hysteresis value H has a value between $(H_{default} - \alpha)$ and $(H_{default} + \alpha)$. Therefore, a dynamic range of the hysteresis value H may be determined by using $\alpha$.

Figure 5:
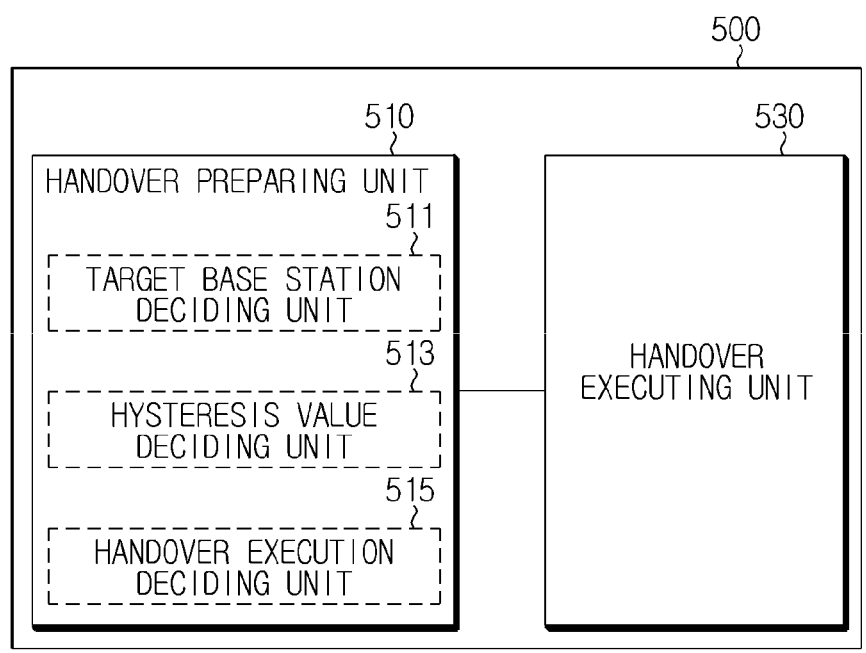
FIG. 5 is a diagram showing a base station in accordance with at least one embodiment of the present disclosure.

FIG. 5 is a diagram showing a base station in accordance with at least one embodiment of the present disclosure. FIG.

5 shows only a partial configuration of the base station for determining a time for executing handover execution.

As shown in FIG. 5, the base station 500 includes a handover preparing unit 510 and a handover executing unit 530.

The handover preparing unit 510 may perform an operation for preparing handover of a mobile terminal connected to the corresponding base station 500. The handover preparing unit 510 includes a target base station deciding unit 511, a hysteresis value deciding unit 513 and a handover execution deciding unit 515.

The target base station deciding unit 511 determines whether a received signal strength of a signal transmitted from the base station 500 and received at the mobile terminal is lower than the threshold value and decides a target base station for handing over the mobile terminal to when the received signal strength is lower than the threshold value.

The target base station deciding unit 511 extracts the received signal strength from a measurement report which is periodically transmitted from the mobile terminal and compares the extracted received signal strength with the threshold value as described above. The target base station deciding unit 511 decides a target base station by using neighboring base station information included in the measurement report.

When the target base station deciding unit 511 decides a target base station for handing over the mobile terminal to, the hysteresis value deciding unit 513 decides a hysteresis value to be used for determining a time of executing handover.

Particularly, the hysteresis value calculating unit 513 checks a load status of the corresponding base station 500, a load status of the target base station, a movement speed of the mobile terminal, and traffic distribution in the mobile terminal at each unit time. The hysteresis value calculating unit 513 calculates a hysteresis value according to Equation 1 based on the load statuses, the movement speed of the mobile terminal, and the traffic distribution in the mobile terminal. Since the method of calculating a hysteresis value was already described above, the detailed description thereof is omitted herein. When the hysteresis value calculating unit 513 decides the hysteresis value at each unit time, the handover execution deciding unit 515 decides whether to execute the handover of the mobile terminal using the decided hysteresis value.

Particularly, the handover execution deciding unit 515 decides to hand over the mobile terminal when subtraction of the received signal strength Rs of the base station 500 from the received signal strength $R_T$ of the target base station is equal to or greater than the calculated hysteresis value and when such condition is maintained for a predetermined duration (Time-to-Trigger). The received signal strength Rs denotes a signal strength of a signal transmitted from the base station 500, which is a source base station and received at the mobile terminal. The received signal strength $R_T$ denotes a signal strength of a signal transmitted from the target base station and received at the mobile terminal.

When the handover execution deciding unit 515 decides to hand over the mobile terminal, the handover executing unit 530 receives a relevant notification from the handover execution deciding unit 515. In addition, the handover executing unit 530 transmits a handover request message to the target base station decided by the target base station deciding unit 511. When a handover request confirmation message is received from the target base station, the handover executing unit 530 sends a handover command to the mobile terminal to complete the handover.

The method of the present disclosure described above may be implemented as a program and stored in a recording medium (CD-ROM, RAM, ROM, floppy disc, hard disc, magneto-optical disc or the like) in a computer-readable form.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

Various substitutions, changes and modifications can be made to the present disclosure described above by those having ordinary skill in the art within the scope of the present disclosure and the present disclosure is not limited to the above embodiments and the accompanying drawings.

What is claimed is:

1. A method of deciding execution of handover of a mobile terminal from a source base station to a target base station in a wireless communication system, the method comprising:
   deciding, by a source base station that currently serves the mobile terminal, a target base station for handover of the mobile terminal;
   deciding, by the source base station, a hysteresis value for determining a time point of executing the handover;
   determining, by the source base station, whether a difference between a first received signal strength of a signal from the target base station to the mobile terminal and a second received signal strength of a signal from the source base station to the mobile terminal is continuously maintained to be equal to or greater than the hysteresis value for a predetermined time duration; and
   deciding, by the source base station, to execute the handover when the difference between the first received signal strength and the second received signal strength is continuously maintained to be equal to or greater than the hysteresis value for the predetermined time duration,
   wherein the deciding, by the source base station, a hysteresis value includes deciding the hysteresis value based on traffic loads of the source base station and the target base station, a movement speed of the mobile terminal, and traffic distribution in the mobile terminal.

2. The method according to claim 1, wherein the deciding, by the source base station, a hysteresis value includes increasing the hysteresis value as a load of the target base station becomes greater than a load of the source base station.

3. The method according to claim 1, wherein the deciding, by the source base station, a hysteresis value includes decreasing the hysteresis value as a real time traffic proportion increases in the traffic of the mobile terminal.

4. The method according to claim 1, wherein the deciding, by the source base station, a hysteresis value includes increasing the hysteresis value as the movement speed of the mobile terminal decreases.

5. The method according to claim 1, wherein the deciding, by the source base station, a hysteresis value deciding the hysteresis value based on assigned weights to the traffic loads of the source base station and the target base station, the movement speed of the mobile terminal, and the traffic distribution in the mobile terminal, where a sum of the assigned weights is 1.

6. The method according to claim 5, wherein the deciding, by the source base station, a hysteresis value includes increasing the hysteresis value as a load of the target base station increases greater than a load of the source base station.

7. The method according to claim 5, wherein the deciding, by the source base station, a hysteresis value includes decreasing the hysteresis value as a real time traffic proportion increases in the traffic of the mobile terminal.

8. The method according to claim 5, wherein the deciding, by the source base station, a hysteresis value includes increasing the hysteresis value as the movement speed of the mobile terminal decreases.

9. The method according to claim 1, wherein the deciding, by the source base station, a hysteresis value includes calculating the hysteresis value based on:

$$H = H_{default} + \alpha \cdot (w_L N_L + w_V N_V + w_S N_S)$$
$$N_L = N_T - L_S, \; N_V = -2\frac{V_j}{V_{max}} + 1, \; N_S = N_{NRT} - N_{RT},$$

where H represents a hysteresis value, $H_{default}$ represents a default hysteresis value, $L_T$ represents a normalized traffic load of a target base station, $L_S$ represents a normalized traffic load of a source base station, $V_j$ represents a movement speed of a mobile terminal i, $V_{max}$ represents a maximum speed limit of the mobile terminal, $N_{NRT}$ represents a non real time traffic volume in the mobile terminal normalized by a traffic volume of the mobile terminal, $N_{RT}$ represents a real time traffic volume in the mobile terminal normalized by a traffic volume of the mobile terminal, $W_L$, $W_V$, and $w_S$ are weights whose sum is 1, and $\alpha$ is a scaling factor.

10. A base station of deciding execution of handover of a mobile terminal in a wireless communication system, the base station comprising:
a target base station deciding unit configured to decide a target base station for handover of the mobile terminal;
a hysteresis value deciding unit configured to decide a hysteresis value for determining a time point for executing the handover; and
a handover execution deciding unit configured to decide to execute the handover when a difference between a first received signal strength of a signal from the target base station to the mobile terminal and a second received signal strength of a signal from the base station to the mobile terminal is continuously maintained to be equal to or greater than the hysteresis value for a predetermined time duration,
wherein the hysteresis value deciding unit is configured to decide the hysteresis value based on traffic loads of the base station and the target base station, a movement speed of the mobile terminal, and traffic distribution in the mobile terminal.

11. The base station according to claim 10, wherein the hysteresis value deciding unit increases the hysteresis value as a load of the target base station becomes greater than a load of the source base station.

12. The base station according to claim 10, wherein the hysteresis value-deciding unit decreases the hysteresis value as a real time traffic proportion increases in the traffic of the mobile terminal.

13. The base station according to claim 10, wherein the hysteresis value deciding unit increases the hysteresis value as the movement speed of the mobile terminal decreases.

14. The base station according to claim 10, wherein the hysteresis value deciding unit decides the hysteresis value by assigning weights to the traffic loads of the base station and the target base station, the movement speed of the mobile terminal, and the traffic distribution in the mobile terminal, where a sum of the assigned weight is 1.

15. The base station according to the claim 14, wherein the hysteresis value deciding unit increases the hysteresis value as a load of the target base station increases to be greater than a load of the source base station.

16. The base station according to claim 14, wherein the hysteresis value deciding unit decreases the hysteresis value as a real time traffic proportion increase in the traffic of the mobile terminal.

17. The base station according to claim 14, wherein the hysteresis value deciding unit increases the hysteresis value as the movement speed of the mobile terminal decreases.

18. The base station according to claim 10, wherein the base station is configured to calculate the hysteresis value based on:

$$H = H_{default} + \alpha \cdot (w_L N_L + w_V N_V + w_S N_S)$$
$$N_L = L_T - L_S, \; N_V = -2\frac{V_j}{V_{max}} + 1, \; N_S = N_{NRT} - N_{RT},$$

where H represents a hysteresis value, $H_{default}$ represents a default hysteresis value, $L_T$ represents a normalized traffic load of a target base station, $L_S$ represents a normalized traffic load of a source base station, $V_j$ represents a movement speed of a mobile terminal i, $V_{max}$ represents a maximum speed limit of the mobile terminal, $N_{NRT}$ represents a non real time traffic volume in the mobile terminal normalized by a traffic volume of the mobile terminal, $N_{RT}$ represents a real time traffic volume in the mobile terminal normalized by a traffic volume of the mobile terminal, $W_L$, $W_V$, and $w_S$ are weights whose sum is 1, and $\alpha$ is a scaling factor.

* * * * *